(12) United States Patent
Hsieh et al.

(10) Patent No.: US 6,512,824 B1
(45) Date of Patent: Jan. 28, 2003

(54) PROXY DATABASE FOR ELEMENT MANAGEMENT SYSTEM OF TELEPHONE SWITCHING NETWORK

(75) Inventors: Jian J. Hsieh, Columbus, OH (US); Phil A. Marzullo, Westerville, OH (US); Liwei Ren, Pittsburgh, PA (US)

(73) Assignee: ADC Services Fulfillment, Inc., Trenton, NJ (US)

( * ) Notice: Subject to any disclaimer, the term of this patent is extended or adjusted under 35 U.S.C. 154(b) by 0 days.

(21) Appl. No.: 09/366,238

(22) Filed: Aug. 3, 1999

Related U.S. Application Data
(60) Provisional application No. 60/096,100, filed on Aug. 10, 1998.

(51) Int. Cl.[7] ............................................. H04M 7/00
(52) U.S. Cl. ............ 379/230; 379/201.01; 379/201.02; 379/201.03; 379/201.05; 379/221.08; 707/10
(58) Field of Search ...................... 379/201.02, 201.03, 379/201.05, 201.12, 221.08, 219, 230; 707/10

(56) References Cited

U.S. PATENT DOCUMENTS

| | | | | |
|---|---|---|---|---|
| 6,038,301 A | * | 3/2000 | Nightingale | 379/201.04 |
| 6,240,174 B1 | * | 5/2001 | Silver | 379/230 |
| 6,393,481 B1 | * | 5/2002 | Deo et al. | 709/224 |

* cited by examiner

*Primary Examiner*—Ahmad F. Matar
*Assistant Examiner*—Bing Bui
(74) *Attorney, Agent, or Firm*—Schwegman, Lundberg, Woessner & Kluth, P.A.

(57) ABSTRACT

An element management system ("EMS") interfaces between a telephone company computer or a terminal for use by a telephone company system administrator or customer service representative, and a telephone network element such as a central office or a group of central offices. In order to store and process subscriber data during the time periods when a telephone computer system is busy controlling telephone switching functions and therefore giving low priority to such data, the EMS contains a proxy database and maintains it between the periods when access to the telephone computer system is desired and available, without detrimentally involving the telephone computer system, the telephone switching network or any elements thereof. The EMS is capable of operating as the sole repository of subscriber data in a telephone computer system configured to operate in such an environment. The proxy database effectively mirrors subscriber data in one or more central offices and/or other network elements of the telephone computer system. By utilizing the proxy database, the EMS (i) provides relatively current subscriber data to telephone company personnel and systems, and (ii) accepts telephone network configuration commands from such personnel and systems, communicates the commands to the corresponding network elements, and upon receiving information indicating that the commands have been carried out, provides verification information to the client personnel and systems.

6 Claims, 13 Drawing Sheets

PROXY DATABASE FOR ELEMENT MANAGEMENT SYSTEM OF TELEPHONE SWITCHING NETWORK

This application claims the benefit of provisional application No. 60/096,100, filed Aug. 10, 1998.

BACKGROUND OF THE INVENTION

This invention relates to an improved element management system for interfacing between a telephone system and a service provider such as a telephone company, to maintain information as to subscriber services and subscriber line configurations. A telephone system is a type of network, and includes network elements such as central offices or groups thereof in which telephone computer systems control corresponding portions of a telephone switching network in accordance with subscriber requirements and subscriber line configurations.

Subscriber services information may include such items as class of service (e.g. business or residential), call waiting, call forwarding, caller ID, the billing plan desired, the long distance carrier desired, the maintenance plan desired, etc. Subscriber line configurations may include such items as the number and types of lines at the subscriber's home or business, which equipment at the subscriber's home or business is owned by the subscriber and which equipment is owned by the telephone company, the type and location of the equipment, information as to leased lines, etc.

In a typical telephone system, well over a hundred, and sometimes a few hundred parameters may be needed to describe the services and line configurations for a single subscriber.

As telephone networks normally have large numbers of subscribers, the amount of data as to subscriber requirements and subscriber line characteristics ("subscriber data") is large. Since the telephone computer systems must give priority to controlling switching functions so that the telephone system operates with high efficiency and minimal "busy" time, access by telephone company customer service representatives and other personnel to subscriber data is relatively slow, and the subscriber data is updated at relatively long intervals. Thus the information available as to subscriber data does not reflect recent changes and may therefore be inaccurate, and there is sometimes an inordinate delay in implementing changes desired by a subscriber.

To provide a more responsive interface between one or more (in some cases as many as several hundred) central offices of a telephone network and telephone company customer service representatives or other telephone company personnel or systems, an Element Management System ("EMS") is frequently utilized. Such an EMS maintains subscriber data in a database which can more quickly and accurately respond to queries from telephone company personnel or automated systems without significantly degrading the switching performance of the telephone network. However, existing EMS units lack sufficient responsiveness to meet desired performance levels.

Accordingly, an object of the present invention is to provide an improved Element Management System and method for interfacing between a telephone system and a service provider such as a telephone company, to more expeditiously maintain and change information as to subscriber services and subscriber line configurations.

A further object of the invention is to provide a database in the EMS which reflects up-to-date data respecting the network element(s) that the EMS manages, such that the data contained in the EMS database is a functional copy of corresponding data utilized by those elements of the telephone switching network which are managed, at least in part, by the EMS.

A further object of the invention is to provide a capability for synchronizing the data stored in the database of a particular EMS with the corresponding data utilized in the network element(s) involved, when the network element data is changed by portions of the telephone network, or associated personnel, independently of the particular EMS.

A further object of the invention is to automatically detect changes in the data stored in or utilized by the managed element(s) of the telephone switching network which corresponds to the data stored in the EMS, and to update the EMS database accordingly; with the frequency of detection of such changes and the frequency of updating the EMS database being separately configurable for each network element.

SUMMARY OF THE INVENTION

The present invention provides an improvement to a network element management system which communicates information from a telephone switching network to a client system.

A proxy database stores data respecting subscriber requirements and subscriber line information. A bidirectional network interface arrangement couples information from at least one element of the network to the proxy database, such element having an associated subscriber data storage means.

Initialization means initializes the proxy database by storing in said proxy database subscriber data corresponding to subscriber requirements and subscriber line characteristics received from the associated subscriber data storage means via the network interface means.

Database updating means is coupled to the network interface means for repopulating the proxy database with current subscriber data stored in the subscriber data storage means associated with the network element to update the data in the proxy database.

Query means is responsive to a query signal from the client system to retrieve corresponding data from the proxy database and communicate the same to the client system.

Database synchronization means serves to synchronize the subscriber data stored in the proxy database with the corresponding subscriber data stored in the network element.

SUMMARY OF PREFERRED EMBODIMENT OF THE INVENTION

As herein described, according to a preferred embodiment of the invention there is provided, in a network element management system for a telephone switching network, an arrangement for communicating information from a telephone switching network to a client system, and for communicating configuration commands from a client system to the network. The arrangement includes a proxy database for storing data respecting subscriber services and subscriber line configurations, and a bidirectional network interface for coupling information and command signals from and to at least one element of the network.

Initialization means is provided for initializing the proxy database in a bulk mode at the startup of the element management system, by storing in the proxy database data corresponding to subscriber services and subscriber line configurations received from at least one network element via the network interface means. In response to command signals from the client system, database updating means causes the proxy database to be repopulated with current subscriber data stored in or for at least one network element, to update the data in the proxy database.

Query means responsive to a query signal from the client system retrieves corresponding subscriber data from the proxy database and communicates the data to the client system.

Configuration means responsive to a network element configuration command signal from the client system translates the configuration command signal into a corresponding network element command signal, and communicates the network element command signal to a corresponding network element via the network interface means. The configuration means, upon receiving a corresponding item of subscriber data from the network element via the network interface means, (i) stores the corresponding item of subscriber data in the proxy database to update the database, and (ii) communicates a corresponding response message back to the client system.

Database synchronization means synchronizes the subscriber data stored in the proxy database with the corresponding subscriber data stored in or for the corresponding network element, by (i) downloading log files from the network element, (ii) parsing the log files to detect any changes in the corresponding subscriber data made by systems other than the element management system, (iii) transmitting network element commands to the network elements to retrieve the corresponding subscriber data from them, and (iv) updating the proxy database with the retrieved corresponding subscriber data.

IN THE DRAWING

Figure 3A:
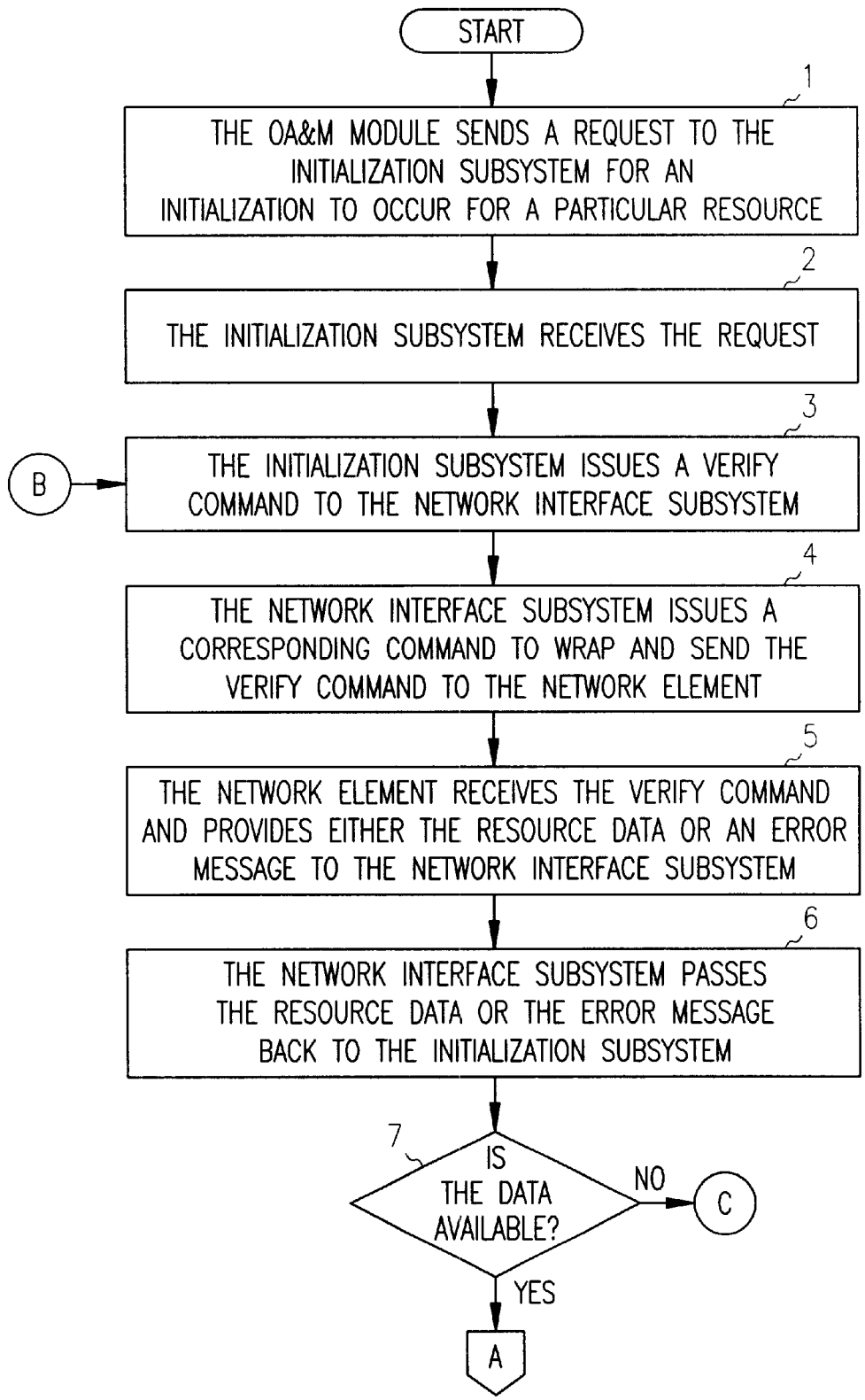
Figure 3B:
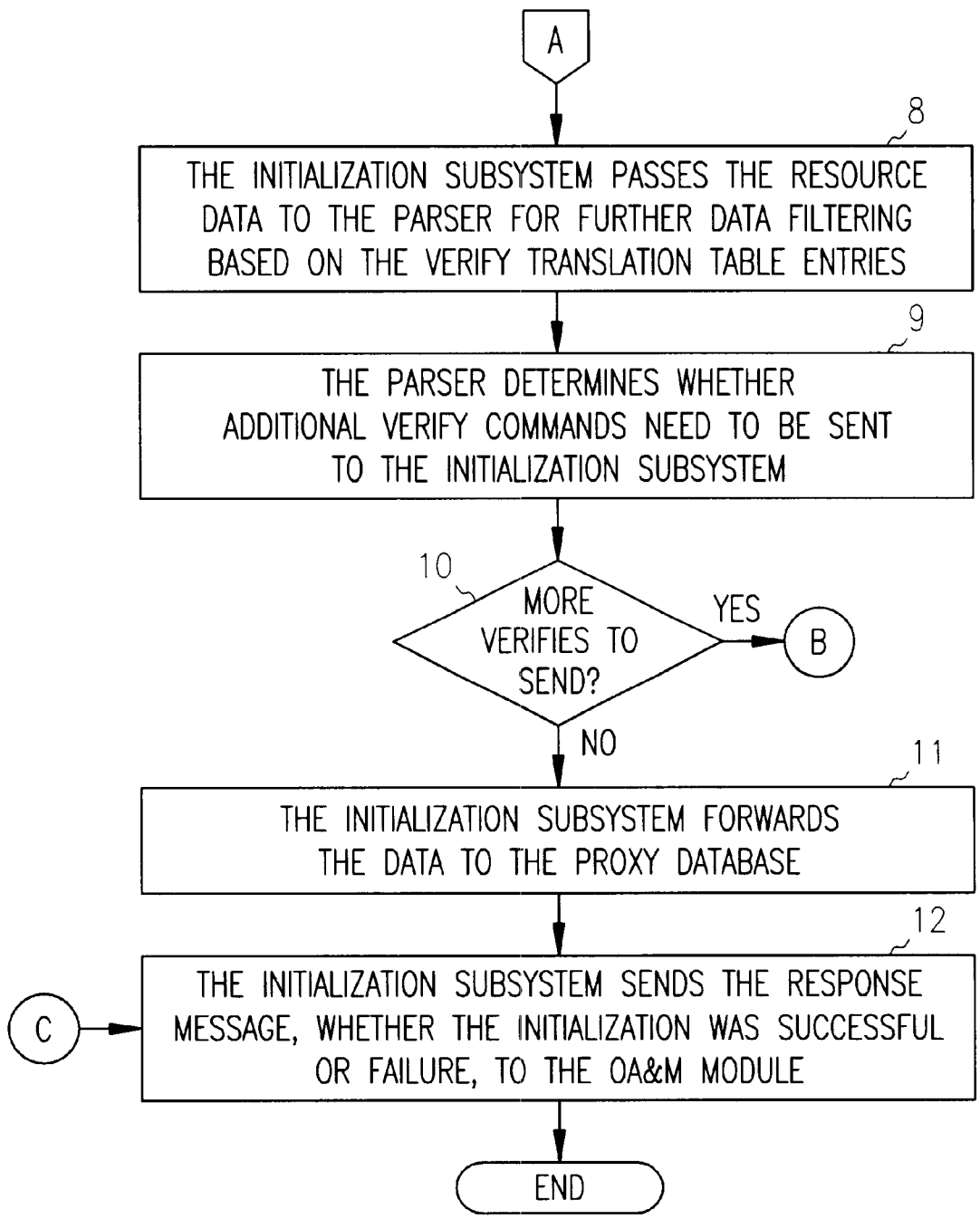

FIGS. 3A and 3B constitute a high level flow chart of the initialization process.

Figure 4:
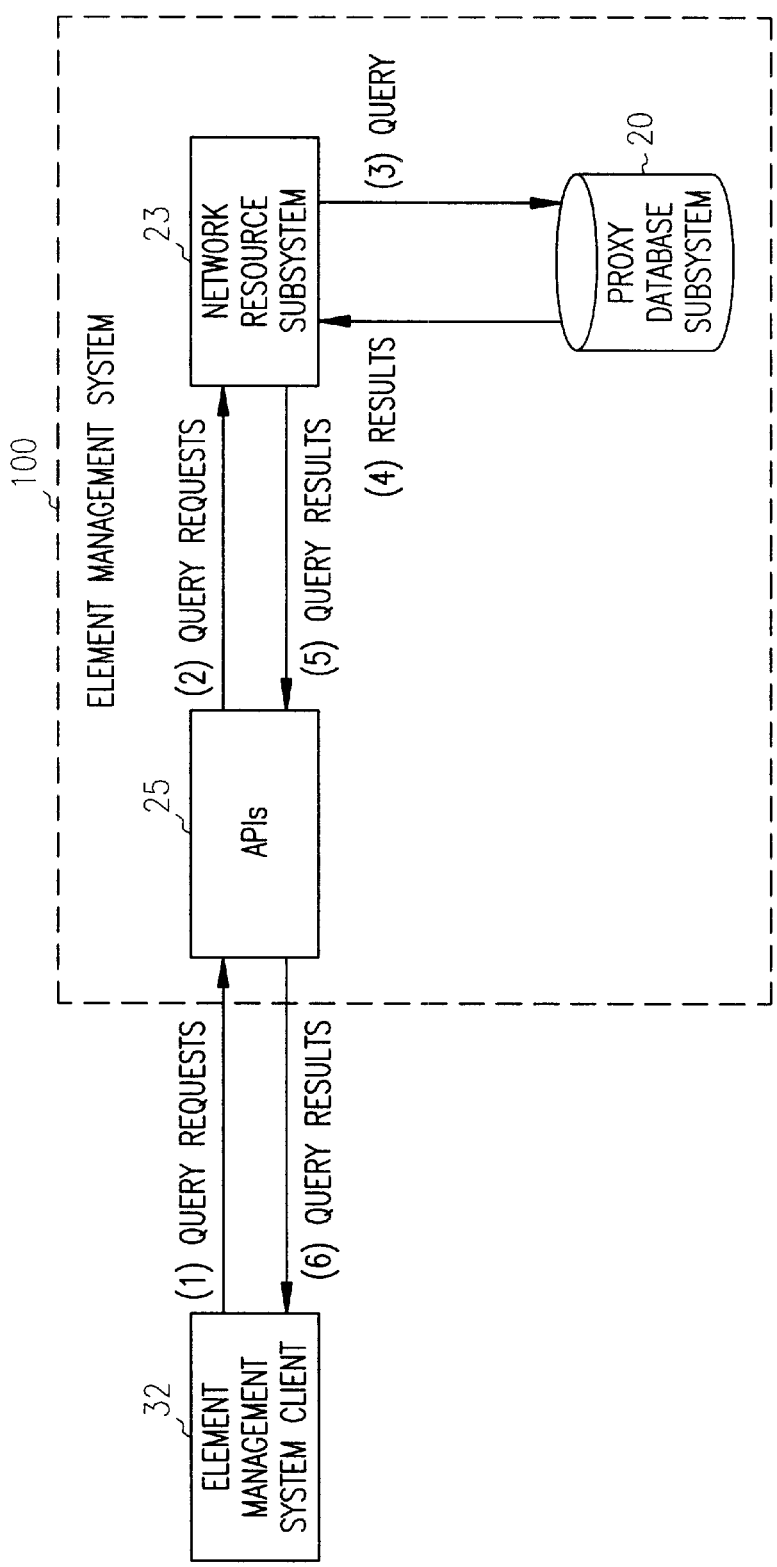

FIG. 4 is a functional block diagram showing the element management system signal flow involved in providing responses to queries from a client system requesting subscriber data.

Figure 5A:
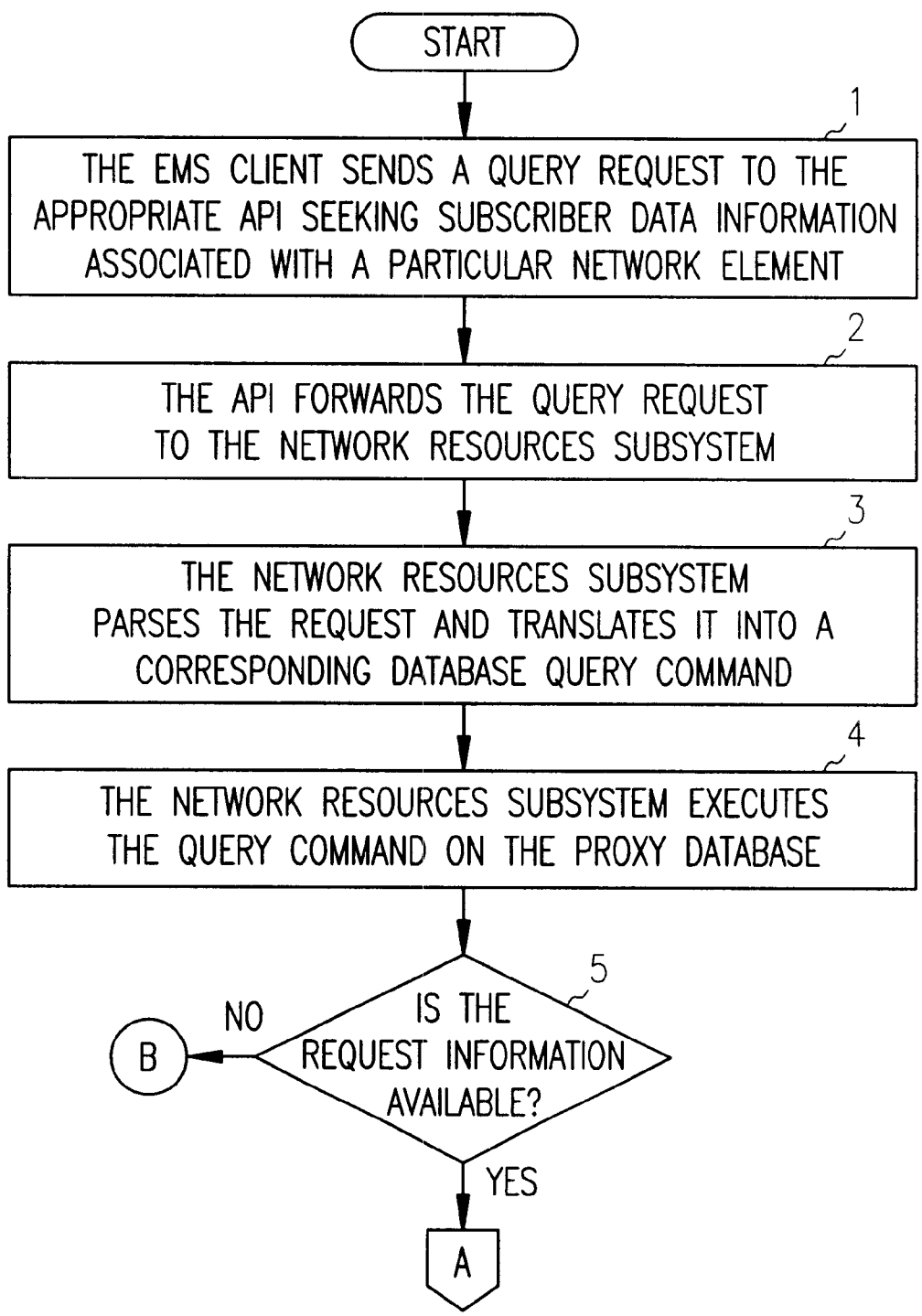
Figure 5B:
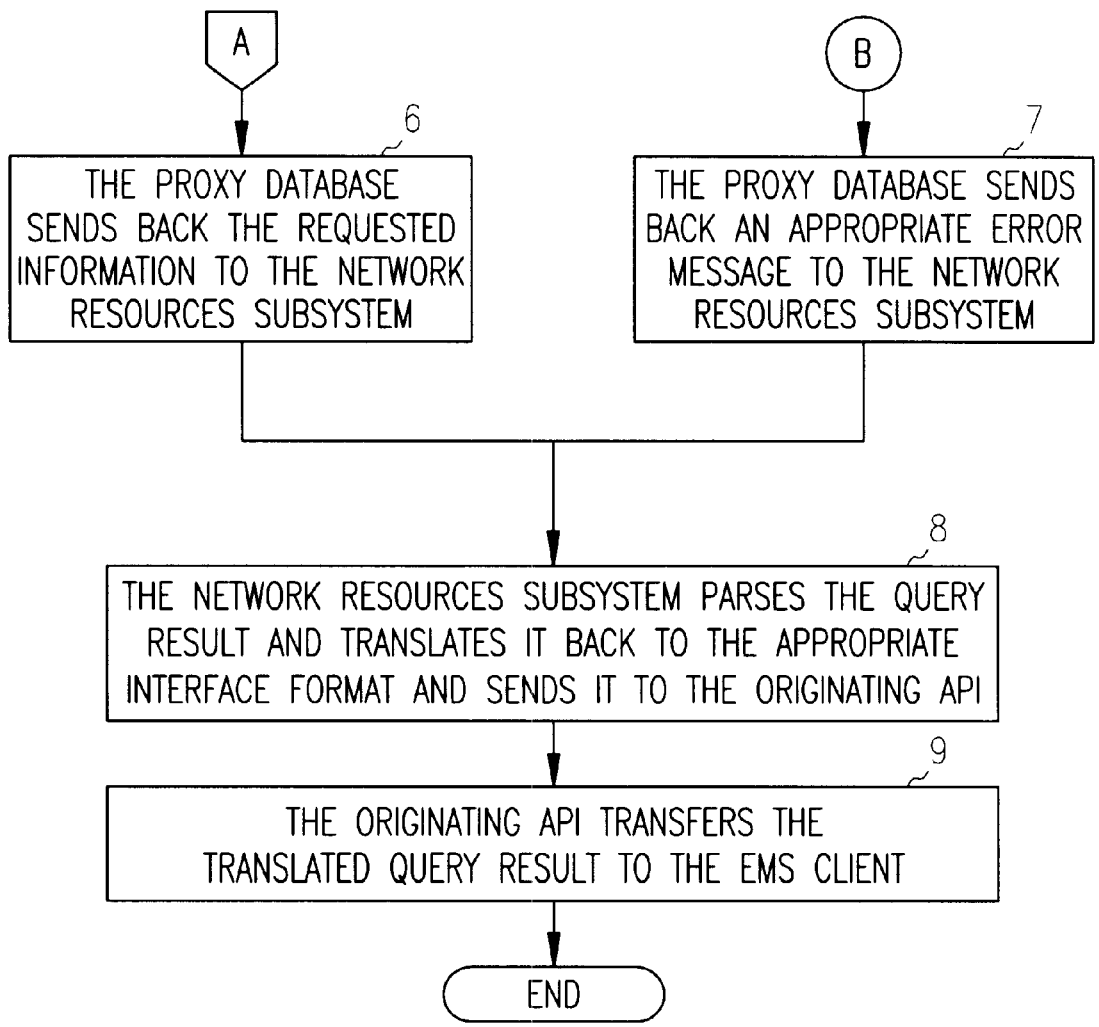

FIGS. 5A and 5B constitute a high level flow chart of the client query process.

Figure 6:
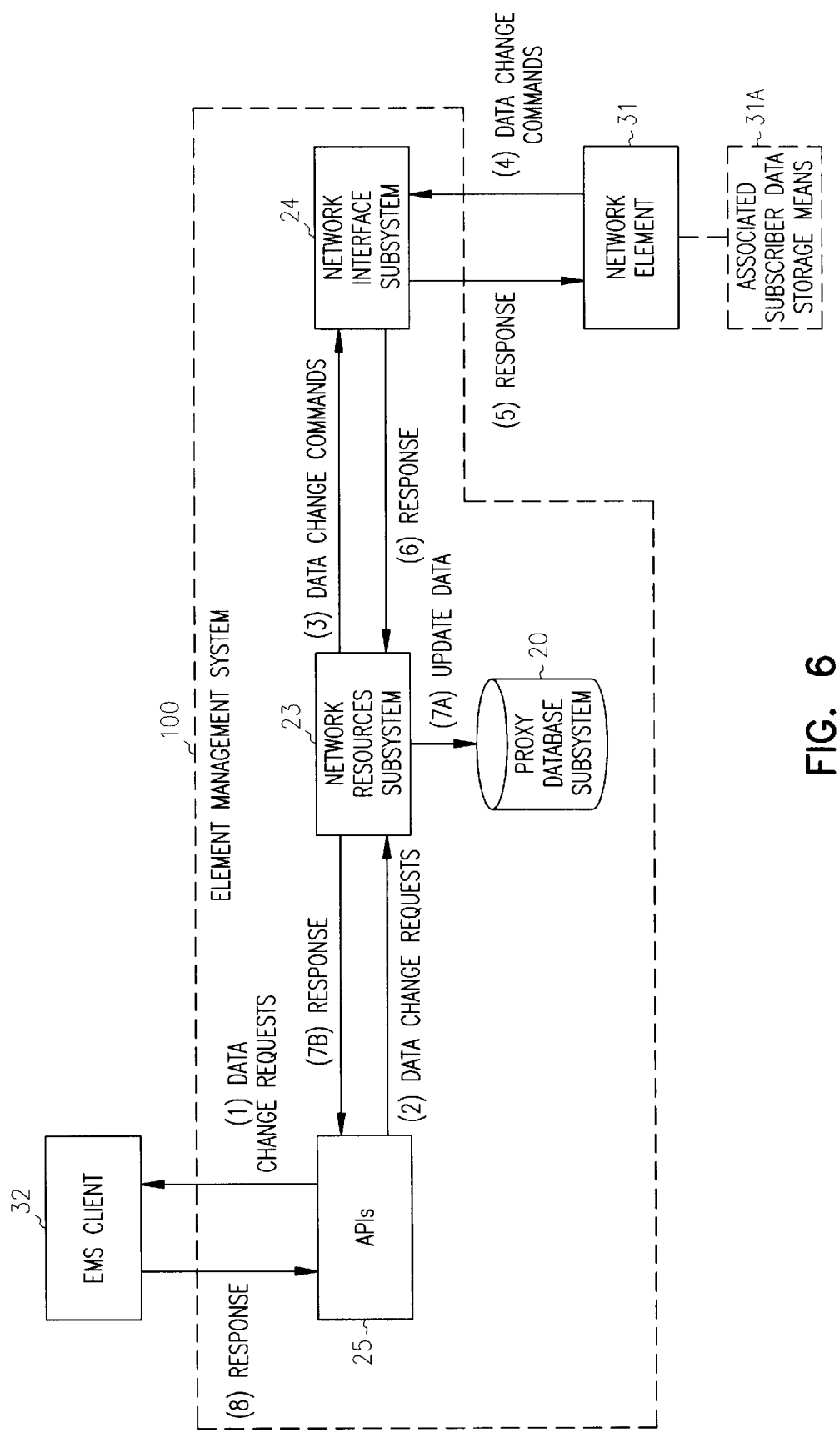

FIG. 6 is a functional block diagram showing the element management system signal flow involved in communicating configuration commands to network elements in response to configuration command signals from a client system.

Figure 7A:
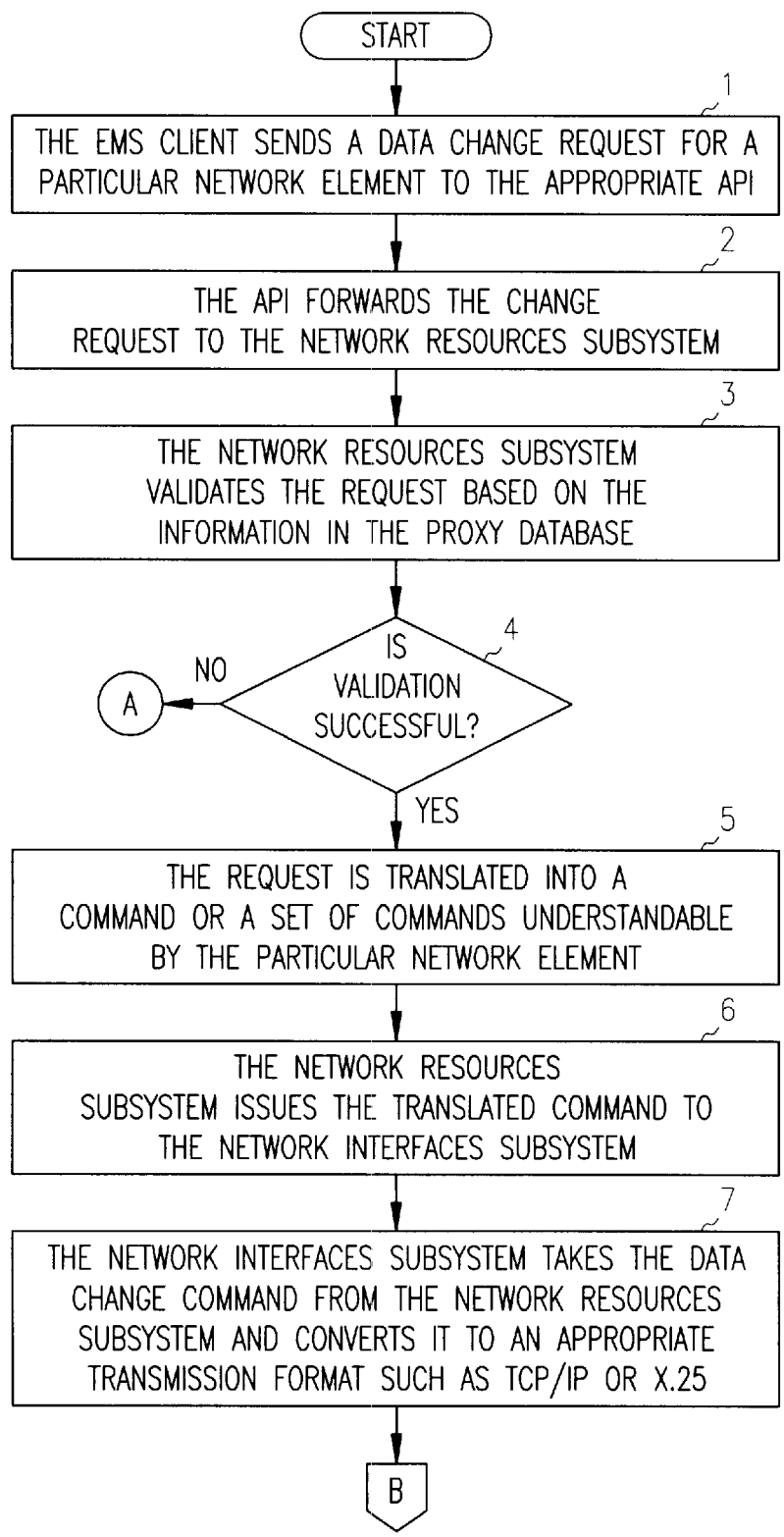
Figure 7B:
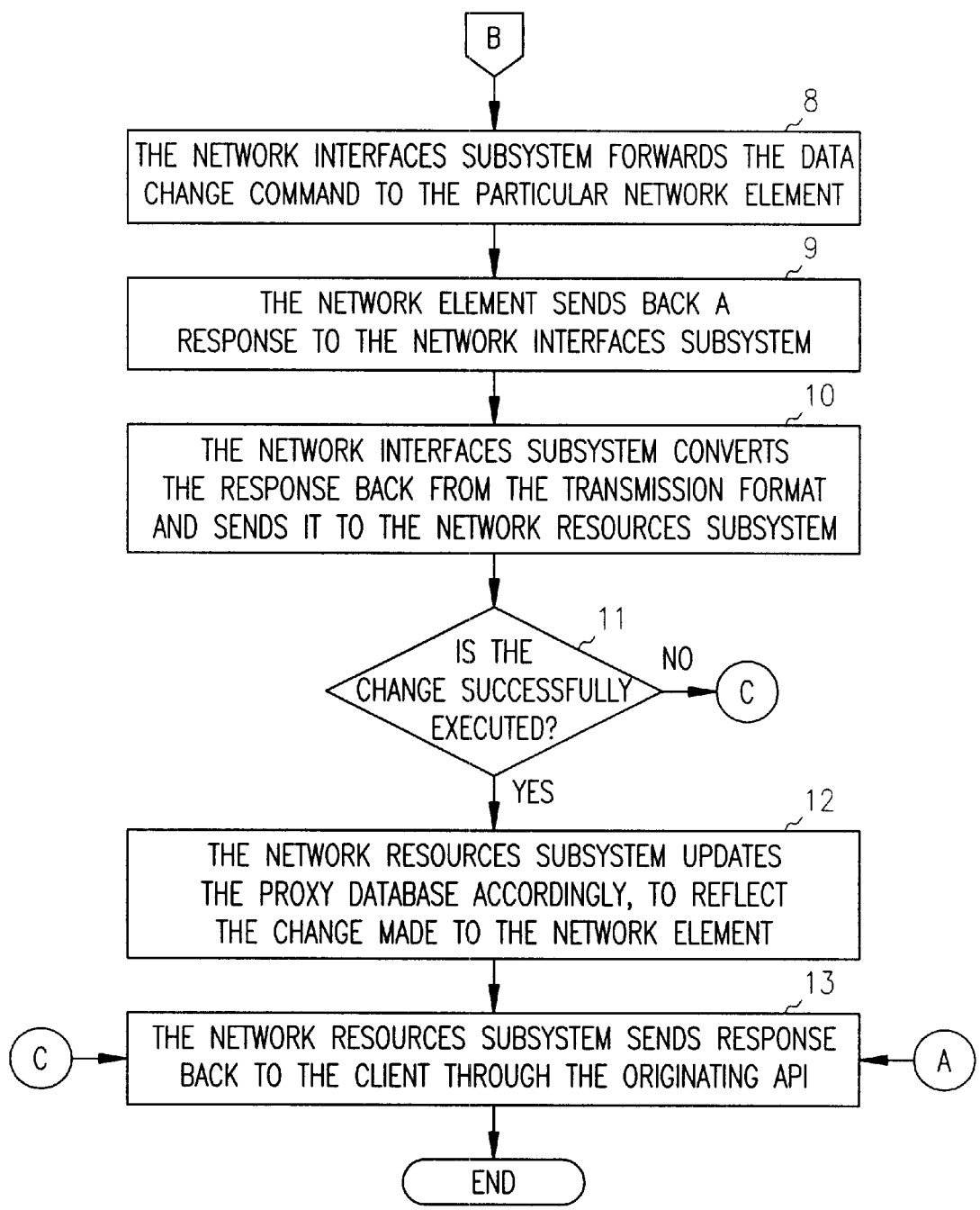

FIGS. 7A and 7B constitute a high level flow chart of the configuration change request process.

Figure 8:
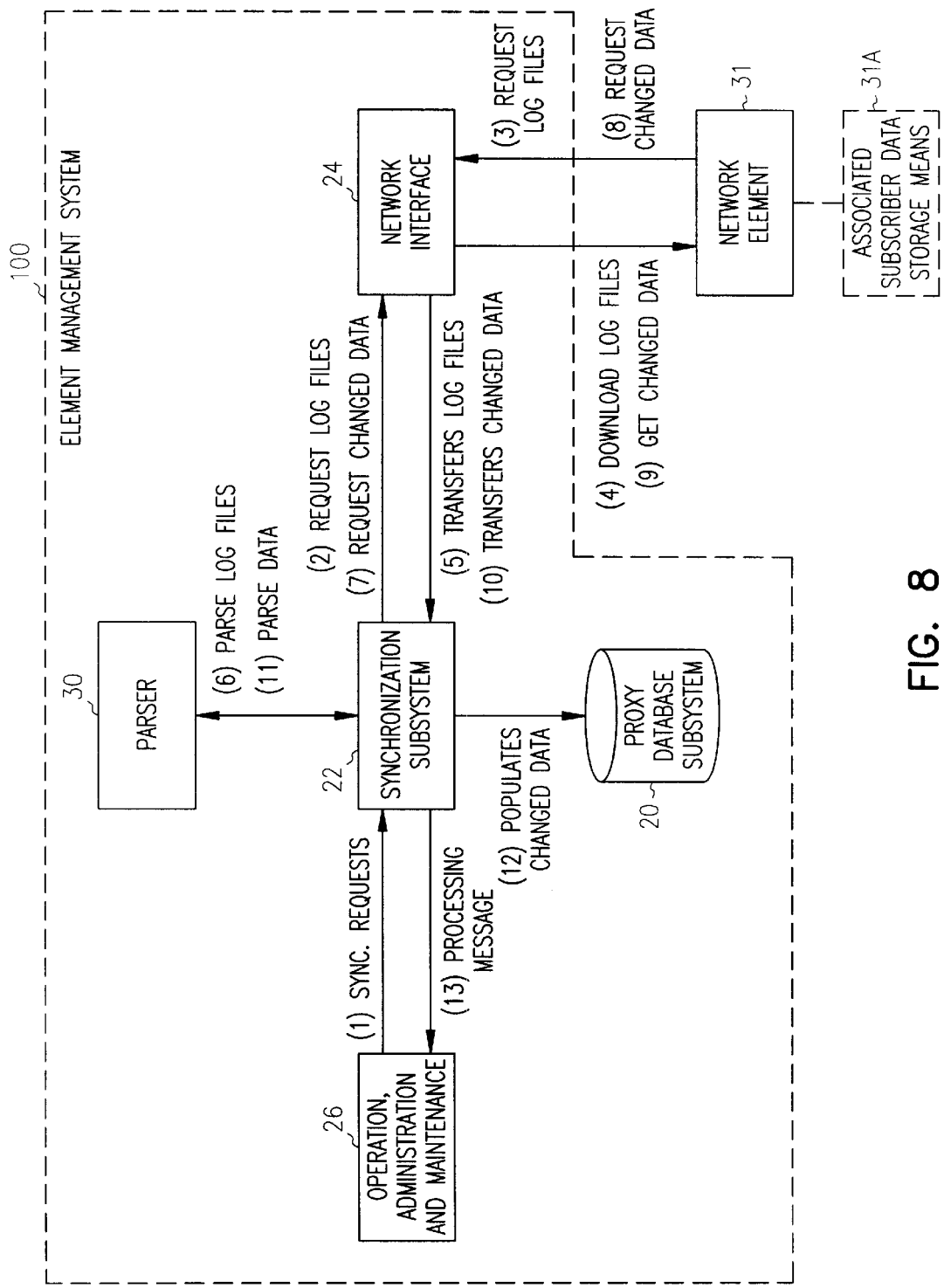

FIG. 8 is a functional block diagram showing the element management system signal flow involved in synchronization of the proxy database with a corresponding network element.

Figure 9A:
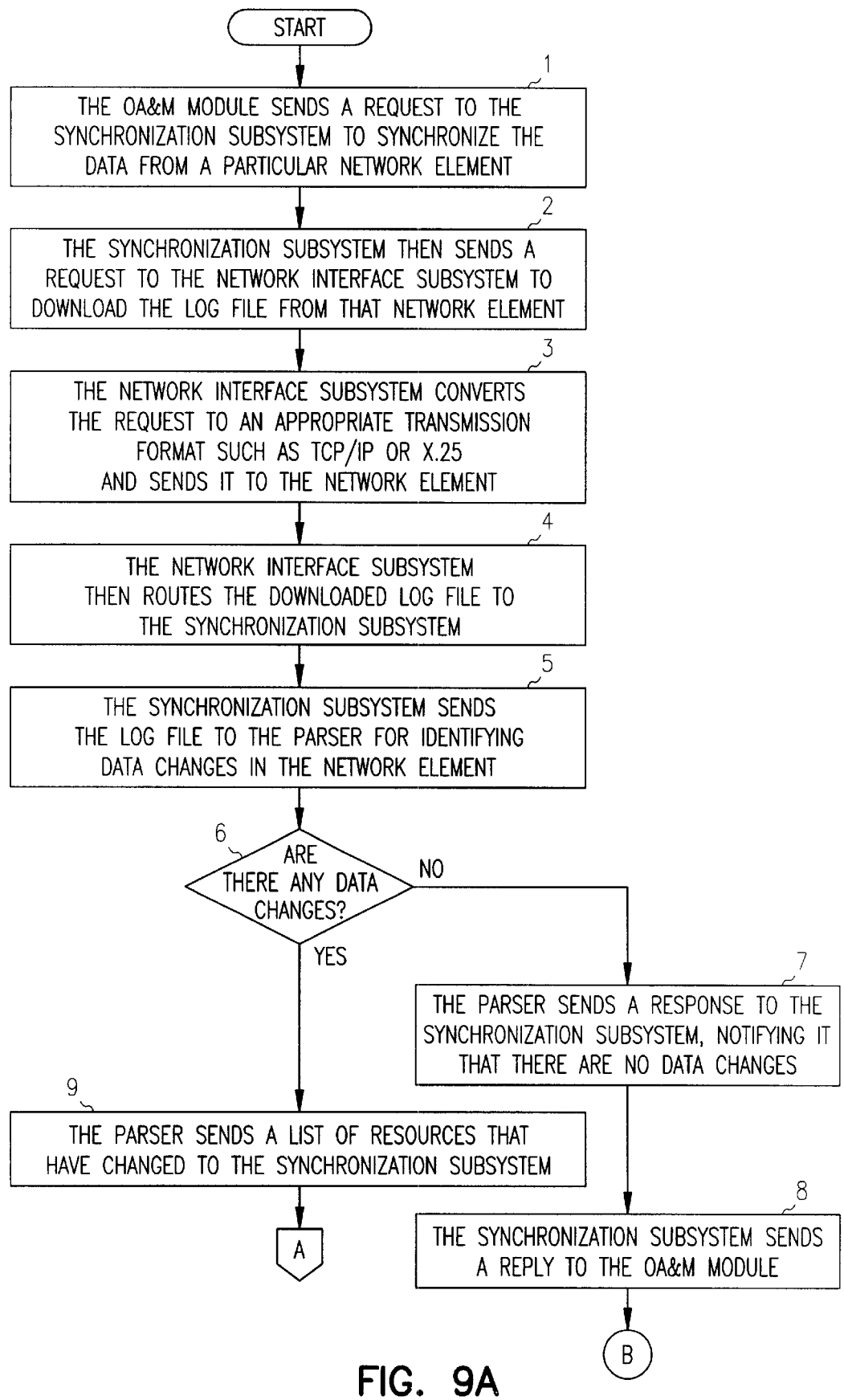
Figure 9B:
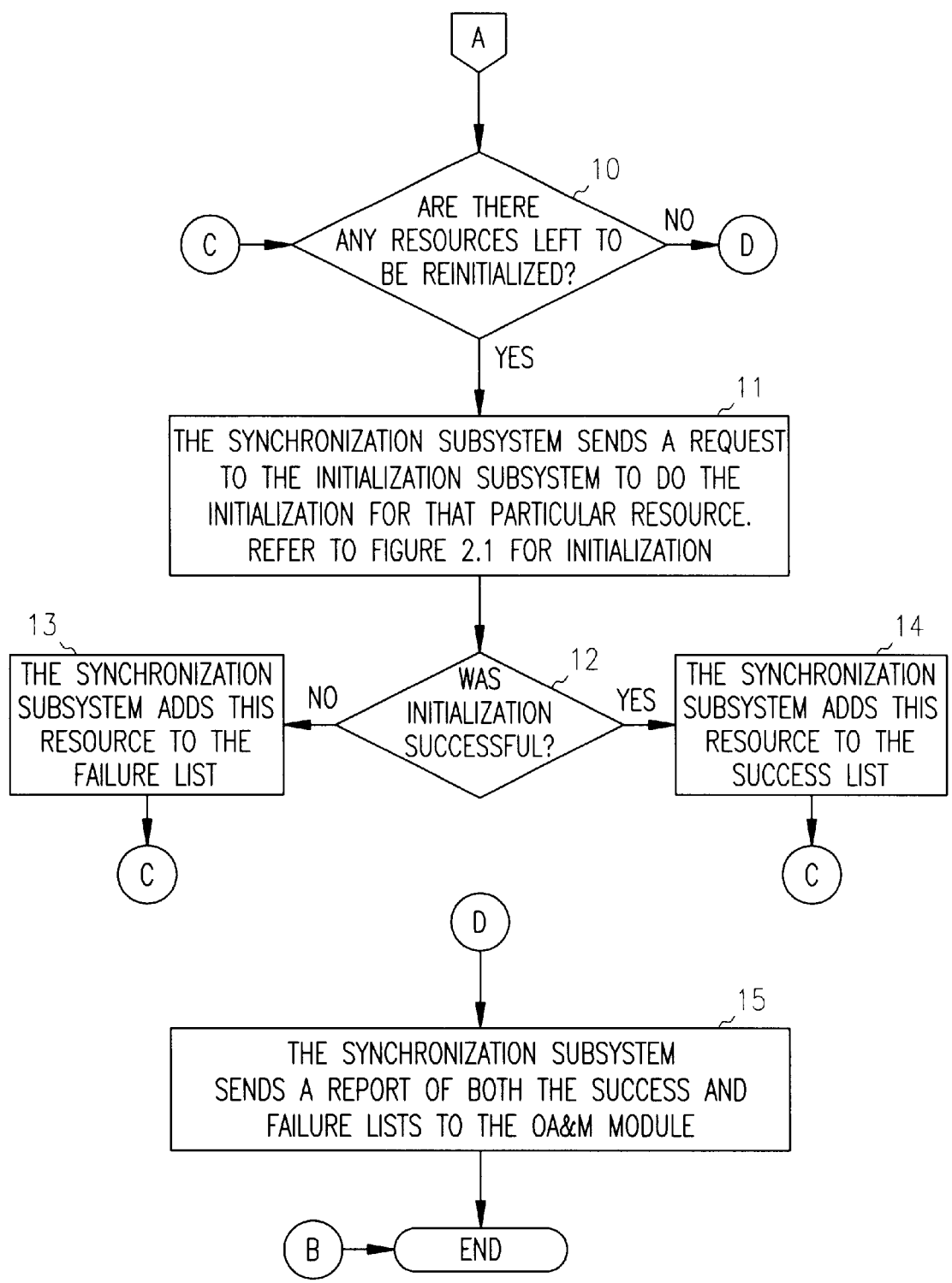

FIGS. 9A and 9B constitute a high level flow chart of the synchronization process.

GENERAL DESCRIPTION

In order to store and process subscriber data during the time periods when a telephone computer system is busy controlling telephone switching functions, i.e. most of the time, an Element Management System ("EMS") is provided in the form of an auxiliary computer system that contains and maintains a database (the "proxy database") of subscriber data.

The EMS interfaces between (i) a client system such as a telephone company computer or a terminal for use by a telephone company customer service representative; and (ii) a telephone network element having an associated facility for storage of subscriber data, such as a central office [which includes a corresponding telephone computer system and telephone switching network portion] or a group of central offices.

The EMS maintains the proxy database between the periods when access to the telephone computer system is available, without detrimentally involving the telephone computer system, the telephone switching network or any elements thereof. The EMS is capable of operating as the sole repository of subscriber data in a telephone computer system configured to operate in such an environment.

With its proxy database, which effectively mirrors subscriber data in one or more central offices and/or other network elements of the telephone computer system, the EMS (i) provides relatively current subscriber data to telephone company personnel and systems, including automatic detection and incorporation of changes in such data made by systems or personnel associated with the telephone network but independent of the EMS, and (ii) accepts telephone network configuration commands from personnel and systems served by the EMS, communicates the commands to the corresponding network elements, and upon receiving information indicating that the commands have been carried out, provides verification information to the client personnel and systems.

DETAILED DESCRIPTION

Overview

Telephone switching systems are designed primarily to handle switching functions. While they do store data detailing the configurations of the telephone lines connected to the switches and can provide that information on request, such information handling tasks are conducted at a very low level of priority. Consequently, responses to requests for information are generally slow.

Proxy Database

Figure 1:
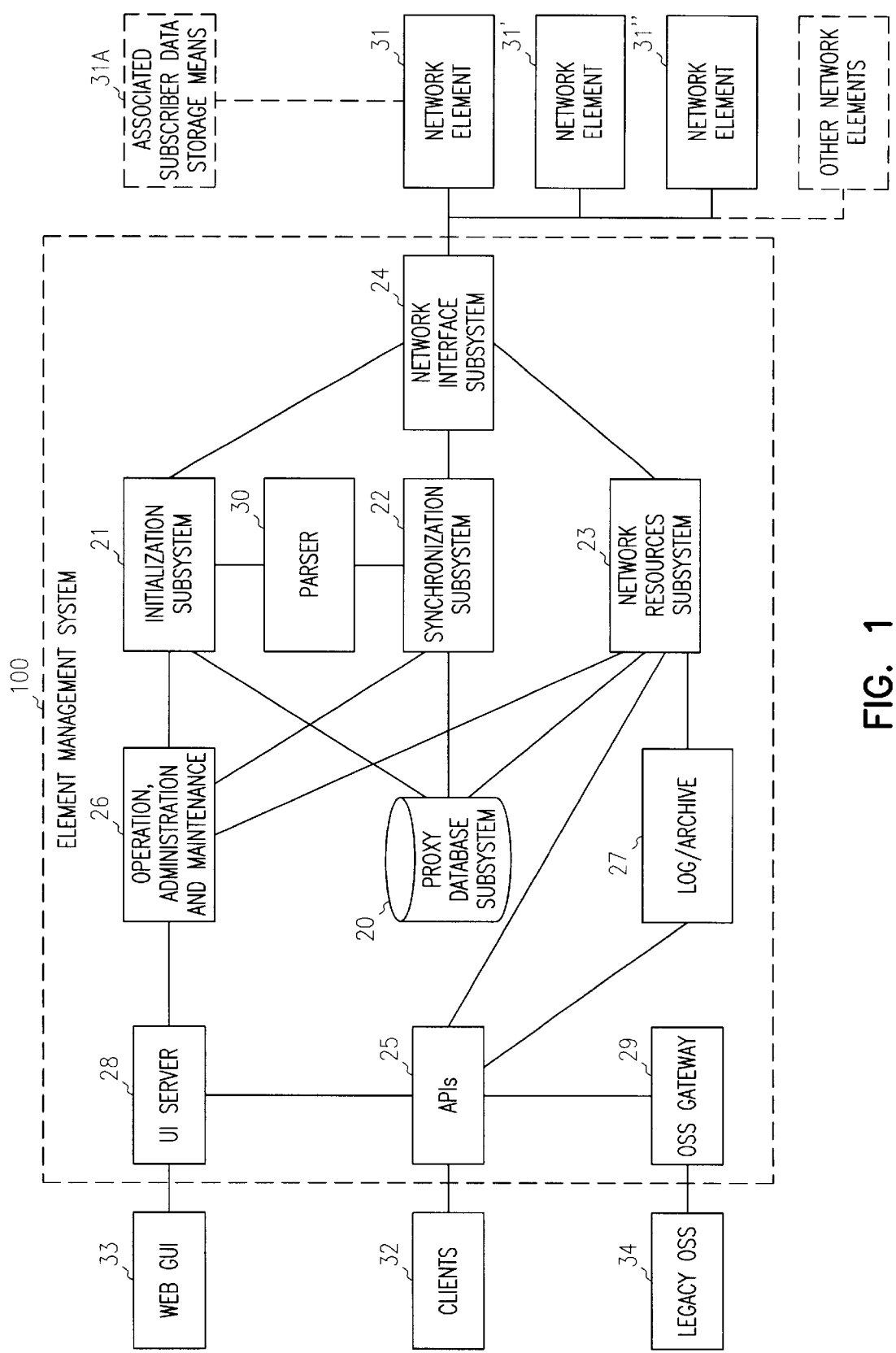
FIG. 1 is a functional block diagram of an element management system incorporating a proxy database arrangement according to the present invention, showing connections between the element management system, a telephone network element, a client system, and related elements.

The element management system ("EMS") 100 according to a preferred embodiment of the present invention, shown functionally in FIG. 1, contains and maintains a proxy database subsystem or proxy database 20 which reflects substantially up-to-date subscriber data as to the services being provided to customers, viz. subscriber requirements and corresponding subscriber line configurations of the central offices and/or other network elements managed by the EMS.

Figure 2:
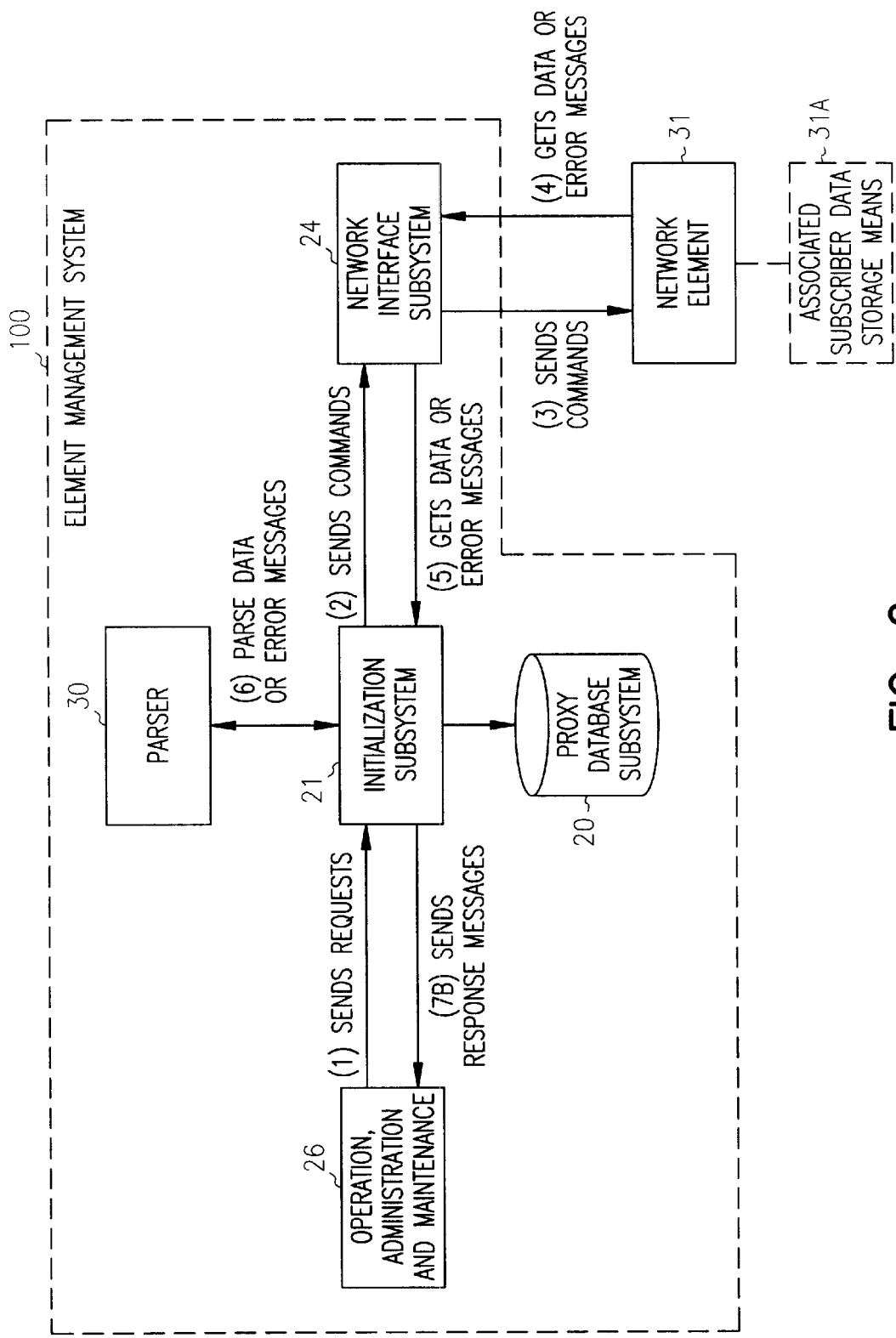
FIG. 2 is a functional block diagram showing the element management system signal flow involved in initialization of the proxy database.

The managed data is fetched from the managed network elements 31, 31', 31" etc. via network connections and stored in the proxy database 20. The EMS 100 also has the capability to populate the proxy database in bulk or single unit mode. The signal flow involved in initialization of the proxy database is shown in FIG. 2.

Subscriber data respecting the network element 31 is stored in an associated subscriber data storage means 31A. Similarly, subscriber data respecting each of the other network elements 31', 31" etc. is stored in corresponding associated subscriber data storage means (not shown). The subscriber data storage means associated with a particular network element may be physically situated at the location of said network element or at a remote site. Reference herein to a network element implicitly includes reference to the associated subscriber data storage means.

Query Process

The proxy database 20 of the EMS mirrors, i.e. contains and maintains on an essentially current basis, a functional copy of the subscriber data (i.e., data as to subscriber requirements and subscriber line configurations) of the managed network elements 31, 31', 31" etc. Thus clients such as telephone company personnel and systems can obtain up-to-date subscriber data by querying the EMS rather than querying the central offices or other network elements and waiting a relatively long time for response. The signal flow involved in the query process is shown in FIG. 4.

Network Element Configuration Change Process

The clients will also send requests to the EMS for configuration changes, i.e. to change certain data in the network elements. A subsystem of the EMS then translates the requests into corresponding network element commands and communicates the commands to the appropriate network elements. Upon receiving responses from the network elements indicating the requested changes have been made, the response messages are sent to the clients, and the proxy database is updated accordingly. The signal flow involved in this configuration changing process is shown in FIG. 6.

Network Element—Proxy Database Synchronization Process

A synchronization subsystem 22 in the EMS 100 keeps the subscriber data in the proxy database 20 synchronized with the network element subscriber data. This subsystem informs the managed network elements 31, 31', 31" etc. as to which data needs to be monitored for the EMS. The network elements input changes in such data into log files, and the synchronization subsystem obtains the log files from the network elements at scheduled time intervals, or in real time. For improved data transfer efficiency, information as to which records have been changed in the time interval since the last accessing of the log files can be parsed out therefrom. The EMS sends commands to retrieve the changed data from the network elements and store the changed data in the proxy database. The signal flow involved in the synchronization process is shown in FIG. 8.

Features and Functions

The proxy database in the EMS keeps a functional copy of the network element subscriber data. The clients of the EMS communicate with the EMS instead of accessing the network elements directly.

In a telephone system, an element management system is a type of operations support system ("OSS") and part of a telecommunication management network ("TMN"), namely that portion which performs configuration management and security management functions. The present invention relates to the configuration management part of the element management system.

Overall Architecture of Element Management System

As shown in FIG. 1, the EMS 100 has the following subsystems, i.e. software modules:

Proxy Database Subsystem 20
Database Initialization Subsystem 21
Database Synchronization Subsystem 22
Network Resources Subsystem 23
Network Interface Subsystem 24
Operation, Administration and Maintenance (OA&M) Subsystem 26
Application Programming Interfaces (APIs) 25
Log/Archive 27
User Interfaces ("UI") Server 28
Operations Support System ("OSS") Gateway 29
Parser 30

Proxy Database

The proxy database subsystem 20 contains a functional copy of the data in network elements 31, 31', 31" etc. which are managed by the EMS, and reflects essentially up-to-date subscriber data of the network elements. The network elements may, for example, be telephone central offices. The proxy database subsystem has the following features and functions:

a. The proxy database is initialized at the startup of the EMS.
b. The proxy database can be populated with fresh data in either single unit or bulk mode; and is preferably initially populated in a bulk mode and thereafter populated in a single unit mode.
c. Any changes in the network elements 31 made by sources outside the EMS are detected in such a way that the proxy database is updated by the synchronization subsystem 22; which automatically detects changes made to subscriber data by sources independent of the EMS, and stores the changed data in the proxy database.
d. To query the data of the network elements 31, the clients of the EMS only need to query the proxy database, thus optimizing the current status of the data available to the clients for a given allocation of network element resources.
e. When the clients 32 of the EMS send configuration requests to the EMS to change the network element data, the network resources subsystem 23 validates the requests and translates the requests into corresponding network element commands. These translated commands are then sent to the network elements. If the commands are successfully executed, the proxy database is updated accordingly. By thus keeping the EMS "in the loop" as to such changes, the current status of the information in the proxy database as to such requested changes is maintained.

Database Initialization Subsystem

The proxy database needs to be initialized at the startup of the EMS 100, using data obtained from the network elements 31, 31', 31" etc. The clients 32 can also repopulate the proxy database in single unit or bulk mode. The initialization and re-population can be scheduled by the OA&M subsystem 26 or manually started by the system administrators.

Database Synchronization Subsystem

To maintain the data contained therein as current as is feasible consistent with the relatively low priority availability of network element resources for data exchange, the proxy database subsystem 20 needs to be kept synchronized with the data of the network elements 31, 31', 31" etc. This subsystem therefore has a mechanism to (i) detect changes made by sources independent of the EMS, and (ii) automatically update the proxy database based on the changes detected. The synchronization process can be scheduled or manually started from the OA&M subsystem 26.

Network Resources Subsystem

The network resources subsystem 23 takes care of data change requests from the clients 32 of the EMS. The requests are validated and translated into network element commands. The validated network element commands are sent to the network elements 31, 31', 31" etc. via the network interface subsystem 24.

After getting successful responses from the network elements 31, the subsystem 23 (i) updates the proxy database accordingly. (ii) sends corresponding response messages back to the clients 32, (iii) compares the old values with the new values in the proxy database, and (iv) sends the differences to the Log/Archive subsystem 27.

Parser

The parser 30 performs two distinct functions. First, it parses log files from the network elements 31. Second, it extracts changed subscriber data from the response sent back from the network elements.

Log files are files that reside in each network element or the associated subscriber data storage means and/or an associated control system and contain information about data that has been changed in or for the network element. Since the log files obtained from a network element vary in format depending on the network element type, they need to be parsed to identify the data records that contain the changed data. The parser 30, for instance, examines these log files to determine what data to retrieve from the corresponding network element for updating of the proxy database 20.

Since the changed data records retrieved from the network element are presented in different formats depending on the network element type, relevant data needs to be extracted, by the parser, from said records before being stored in the proxy database.

Network Interface Subsystem

The network interface subsystem 24 supports interfaces with different network elements based on specific protocols such as TCP/IP, X.25, for example.

Operation, Administration and Maintenance Subsystem

The operation, administration and maintenance ("OA&M") subsystem 26 provides services to both EMS clients and internal EMS subsystems for management of the EMS application system resources. Features and functions of the OA&M subsystem include:

a. Providing OA&M resource management services to EMS clients. For example, such services allow telephone company system administrators to establish and change (i) the frequency of backup of EMS files, (ii) the frequency of interrogation of network elements by the synchronization subsystem, and (iii) security levels, user identification codes and passwords for access to and/or control of various aspects of the EMS and the network elements with which it is associated.

b. Management of a configuration database incorporated in the EMS and containing information such as login identification codes and network addresses.

c. Access protection of the OA&M resources stored in the log/archive subsystem 27.

d. Management of the archive of the log/archive subsystem 27.

Log/Archive Subsystem

The log/archive subsystem 27 provides services to both EMS clients and internal EMS subsystems for the management of the EMS logs (i.e., the recent change history logs) and archives, and functions as the gateway into the EMS Log database and archive within said subsystem.

Application Programming Interfaces

The application programming interfaces (APIs) 25 provide a communication infrastructure between the EMS 100 and its clients 32 across distributed and heterogeneous computing environments. Two categories of interfaces are included, namely (i) common object request broker architecture ("CORBA") APIs and (ii) customizable APIS. Features and functions of the Application Programming Interfaces include:

a. Determining where specific network resource objects (such as concentrators, satellite links, etc.) are.

b. Access protection of the network resources.

c. Directing requests from the EMS clients to the appropriate EMS subsystems and redirecting the responses from said subsystems back to the EMS clients.

User Interfaces Server

The user interfaces (QUIZ) server 28 acts to couple the EMS to an external web to enable clients and remote users to utilize the web or wide area network 33 to provide services that the EMS cannot provide directly. Functions of the user interfaces server include:

a. Providing a web based browser interface for EMS services.

b. Converting user interface configuration requests into CORBA interface requests.

c. Converting responses received via the web to a form usable by the EMS.

d. Managing data communication sessions (open, closed, etc.) between the EMS and web based browsers.

Operations Support Systems Gateway Subsystem

The operations support systems ("OSS") gateway subsystem 29 acts as a gateway between the EMS and other operations support systems such as Legacy OSS 34 that need access to the EMS services but are not supported by the CORBA interfaces. The features and functions of the operations support systems gateway subsystem include:

a. Converting OSS-specific configuration requests into one or more EMS CORBA interface requests.

b. Converting the responses back to the OSS-specific format.

c. Managing data communication sessions (open, close, etc.) between the OSS and EMS CORBA interfaces.

Operation of the Proxy Database

The proxy database 20 has four principal modes of operation, namely: (1) Initialization; (2) Client query; (3) Network element data change request; and (4) Synchronization.

Initialization

When a new circuit (telephone line) is added to a telephone network switch or when the EMS starts up initially, the data in the proxy database must be initialized. FIG. 2 illustrates the operation of the software modules of the EMS when initialization is performed.

First, the OA&M module 26 requests an initialization to occur. This request is coupled to the initialization subsystem 21 via line 1. The initialization subsystem issues a command on line 2 to the network interface subsystem 24, which issues a corresponding command to the network element(s) 31 on line 3. The network element(s) provides either the data, if it is available, or an error message, if a communication or other error occurs; and sends the data or error message on line 4 to the network interface subsystem 24, which issues a corresponding response signal back to the initialization subsystem 21 on line 5. The response signal is passed to the parser 30 on line 6, for further data filtering, and then forwarded to the proxy database on line 7a. Then the initialization subsystem 21 sends the response messages to the OA&M module 26 via line 7b.

Details of the Initialization Process

This section describes, in more detail, the interaction between the different subsystems involved in the initialization process. FIGS. 3A and 3B illustrate the step-wise process flow of the initialization process.

In Step 1, the OA&M module sends a request to the initialization subsystem for initialization of a particular resource, for example, a telephone number. In Step 2, the initialization subsystem receives this request. In Step 3, the initialization subsystem issues a verify command to the network interface subsystem. The verify command is a switch command, which returns the data associated with a particular resource, specified as part of the command.

In Step 4, the network interface subsystem issues a corresponding command, which wraps the verify command, to the network element. For example, if the network interface subsystem uses X.25 protocol to communicate with the network element, then it opens a session with the network element host. The network interface subsystem then sends the verify command, which is the data to be sent, through the session and then closes the session.

In Step 5, the network element receives the verify command and provides either the resource data or an error message to the network interface subsystem as the response. In Step 6, the network interface subsystem passes the resource data or the error message back to the initialization subsystem after converting the data or error message back from the transmission format to the original format.

In Step 7, the availability of the data is checked. If the data is available the program proceeds to Step 8. If the data is not available then the program proceeds to Step 12. In Step 8, the initialization subsystem passes the resource data to the parser for further data filtering, based on the verify translation table entries. The parser uses the resource data and the entries in the verify translation table to get the value for the features and functions associated with the resource.

In Step 9, the parser determines whether it needs to send additional verify commands to the initialization subsystem. Most of the time, due to the low priority given to such data exchanges by network elements, all the data associated with a resource cannot be retrieved in response to a single verify command.

In Step 10, the program either proceeds to Step 11 or loops back to Step 3 based on whether more verify commands need to be sent.

In Step 11, the initialization subsystem has all the data pertaining to the resource and it then forwards this data to the proxy database by issuing database commands. In Step 12, the initialization subsystem sends the response message, i.e. whether the initialization was successful or not, to the OA&M module.

Client Query

At times, a client, such as a user, an administrator, a service representative, or another system, will need to determine the status or configuration of, for example, a particular telephone line. Since such information resides in the proxy database, it can be obtained directly from that database without the necessity to access a network element such as the central office to which the particular telephone line is connected. The manner in which software modules of the EMS process a client query is shown in FIG. 4.

Initially, the client 32 sends a query request to the appropriate application programming interface of the APIs 25 on line 1, seeking subscriber data information associated with a particular network element of the elements 31, 31', 31" etc. (FIG. 1); such information being also contained in the proxy database.

The application programming interface forwards the query request to the network resources subsystem 23 via line 2. The network resources subsystem parses the request and translates it into a corresponding database query command, which is communicated to the proxy database via line 3. The proxy database then searches for the requested information.

Since the proxy database is concerned solely with data management, it responds much more quickly than would the network element itself. The query result, which may be the requested information or an error message if the requested information is not available or an error is encountered during the database search, is sent back to the network resources subsystem 23 via line 4. The network resources subsystem then passes the query result to the originating application programming interface of the APIs 25 via line 5; and that application programming interface converts the result to an appropriate interface format and transfers it to the client 32 via line 6.

Details of the Client Query Process

This section describes, in more detail, the interaction between the different subsystems involved in the client query process. FIGS. 5A and 5B illustrate the step-by-step process flow of the client query process.

In Step 1, the EMS client sends a query request to the appropriate application programming interface, seeking subscriber data information associated with a particular network element. The application programming interface can be thought of as a server module that communicates with the EMS client.

For example, the API could be a CORBA server, a Web Server, or any customized server that can service the EMS client. This server receives the requests from the client and sends responses from the EMS back to the client.

In Step 2, the application programming interface forwards the query request to the network resources subsystem after removing the transmission information, such as the protocol headers and trailers, from the query. At this stage, the query is in the appropriate interface format as needed by the EMS.

In Step 3, the network resources subsystem parses the request and translates it into a corresponding database query command. In Step 4, the network resources subsystem executes the database query command on the proxy database. In Step 5, a check is made on the availability of the requested information. If the requested information is available, the program goes to Step 6. If the requested information is not available, then the program proceeds to Step 7.

The query result may be the requested information or an error message. If either the requested information is not available or an error is encountered during the database search, an error message is received as a result of the execution of the query command.

In Step 6, the proxy database sends back the requested information to the network resources subsystem. In Step 7, the proxy database sends back an error message to the network resources subsystem. The program reaches Step 8 either through Step 6 or Step 7.

In Step 8, the network resources subsystem parses the query result, translates it to the appropriate interface format and sends it to the originating application programming interface. In Step 9, the originating application programming interface transfers the translated query result to the EMS client and then the program exits.

Since the proxy database is concerned solely with data management, it responds more quickly to a client query than the actual network element. Without such a proxy database, substantially more time would be required to process the client query, due to the additional steps described below:

a. The query would have to be sent to the network element across the network;

b. The network element would have to process the query and respond to it in addition to the other work it does; and c. The response would have to be received from the network element across the network.

Network Element Data Change Request

From time to time, the status or configuration of one or more telephone lines (or other components) associated with a network element needs to be modified, usually to reflect changes in subscriber data. In such an instance, the change is relayed to the corresponding network element, where the change actually occurs; and upon verification that the change has occurred, the proxy database is updated to reflect the change. FIG. 6 illustrates the operation of the cognizant software modules of the EMS when a data change is requested.

First, a client 32 sends a data change request for a particular network element of the elements 31 to the appropriate application programming interface of the APIs 25 via line 1. The application programming interface forwards the change request to the network resources subsystem 23 via line 2. The network resources subsystem validates the request, based on the information in the proxy database. If successfully validated, the request is translated into a command or commands understandable by the particular network element. The network resources subsystem then issues the translated command to the network interface subsystem 24 via line 3.

The network interface subsystem is the module that actually communicates with the network element by taking the data change command from the network resources subsystem, converting it to an appropriate transmission format, such as TCP/IP or X.25, and forwarding it to the particular network element of the elements 31 on line 4.

If the change is successfully executed, the particular network element will send back a response to the network interface subsystem 24 via line 5, where the response is converted back from the transmission format and sent back to the network resources subsystem 23 via line 6. If there was an error, the network element will, instead of sending a positive response indicating the requested change was made or will be made, send an error message as a (negative) response.

If the response is positive, the network resources subsystem 23 updates the proxy database accordingly via line 7a, to reflect the change made to the network element. Regardless of the nature of the response (positive or error), the network resources subsystem always communicates the response back to the client 32 on line 8 via the originating application programming interface, to which the response is communicated on line 7b.

Details of the Network Element Data Change Request Process

This section describes, in more detail, the interaction between the different subsystems involved in the network element data change request process. FIGS. 7A and 7B illustrate the step-by-step process flow of the data change request process.

In Step 1, the EMS client sends a data change request for a particular network element to the appropriate application programming interface. In Step 2, the application programming interface forwards the change request to the network resources subsystem. In Step 3, the network resources subsystem validates the request based on the information in the proxy database.

Examples of the different types of validation are checks across different tables in the database (cross-data file checks), checks across different records in the same table (cross-record checks), and checks across different fields in the same record (cross-field checks). For example, if telephone number 555-1212 has the feature called Call Forward Busy turned on then its Call Forward Busy Telephone Number must be set to a valid telephone number for the call to be successfully forwarded when telephone number 555-1212 is busy. This is an example of a cross-field check.

In Step 4, a check is made as to whether the validation was successful. If the validation was successful, the program proceeds to Step 5. If the validation was not successful then the program proceeds to Step 13.

In Step 5, the request is translated into command(s) understandable by the network element. Each network element has a specific set of commands that can be used to manipulate the data of that network element.

In Step 6, the network resources subsystem issues the translated command to the network interface subsystem. In Step 7, the network interface subsystem, which is the module that actually communicates with the network element, takes the data change command from the network resources subsystem and converts it into an appropriate format (e.g., TCP/IP, X.25) [see Step 4 of the Initialization process—FIG. 3A—for more detail in this respect]. In Step 8, the network interface subsystem forwards the data change command to the network element.

In Step 9, the network element sends back a response to the network interface subsystem. In Step 10, the network interface subsystem converts the response back from the transmission format and sends it to the network resources subsystem.

In Step 11, a check is made as to whether the change was successfully executed or not. If the change was successfully executed, then the program proceeds to Step 12. If the change was not successfully executed, the program proceeds to Step 13.

In Step 12, the network resources subsystem updates the proxy database accordingly, to reflect the change made to the network element. In Step 13, the network resources subsystem sends a response, indicating whether the data change request was successful or not, back to the EMS client through the originating API; and then the program exits.

Synchronization of the Proxy Database

The data in the proxy database 20 must be periodically updated to accurately reflect the status or configuration of the network elements 31, 31', 31", etc. FIG. 8 illustrates the operation of the cognizant software modules of the EMS 100 when the contents of the proxy database are synchronized with the subscriber data of a network element.

The synchronization process starts when the OA&M module 26 sends an update request to the synchronization subsystem 22 via line 1. Upon receiving the request, the synchronization subsystem sends a request to the network interface subsystem 24 on line 2; and the network interface subsystem sends a corresponding request to the corresponding one or more of the network elements 31, 31', 31" etc. for downloading a log file to the network interface subsystem on line 4, which routes the log file being downloaded to the synchronization subsystem 22 via line 5.

Once the log file is received, the synchronization subsystem sends it to the parser 30 via line 6 for identifying data changes in the network element. If there are any changes, they are identified by a signal from the parser to the synchronization subsystem on line 11; and the synchronization subsystem requests the changed data from the network elements 31 on line 7 to the network interface subsystem 24, which communicates the request to the network elements 31 via line 8.

The network elements 31 reply by sending the changed data back to the network interface subsystem 24 on line 9, which routes the changed data to the synchronization subsystem 22 on line 10. Thereafter the synchronization subsystem transfers the changed data to the parser 30 via line 11 for further data filtering, and then stores the filtered data in the proxy database via line 12. Then the synchronization subsystem 22 sends a reply signal to the OA&M module 26, either confirming that the subscriber data has been updated in the proxy database, or delivering an error message.

Details of the Synchronization Process

This section describes, in more detail, the Interaction between the different subsystems involved in the synchronization process. FIGS. 9A and 9B illustrate the step-by-step process flow of the synchronization process. In Step 1, the synchronization process starts when the OA&M module sends an update request to the synchronization subsystem.

In Step 2, the synchronization subsystem sends a request to the network interface subsystem to download the log file from the network element. The log file contains the changes made to the data in the network element.

In Step 3, the network interface subsystem converts the request to an appropriate transmission format, such as TCP/IP or X.25, and sends it to the network element [see Step 4 of the Initialization process—FIG. 3A—for more detail in this respect].

In Step 4, the network interface subsystem routes the downloaded log file to the synchronization subsystem. In Step 5, the synchronization subsystem sends the log file to the parser for identifying data changes in the network element. The parser looks only for the data changes made since the last time the log file was downloaded.

In Step 6, a check is made to find whether there are any data changes made by systems outside of the EMS. The parser does not consider the changes made through the requests by the EMS because those changes would have already been incorporated in the proxy database during the data change request process [refer to step 12 of the network element data change request process—FIG. 7B]. If there are any changes, the program proceeds to Step 9. If there are no data changes, then the program proceeds to Step 7.

In Step 7, the parser sends a response to the synchronization subsystem notifying it that there were no data changes. In Step 8, the synchronization subsystem sends an appropriate reply to the OA&M module and the program exits.

In Step 9, the parser sends a list of resources that have changed to the synchronization subsystem. In Step 10, a check is made to find whether there are any resources left to be synchronized. If there are any resources left to be synchronized, then the program proceeds to Step 11. If not, then the program proceeds to Step 15.

In Step 11, the synchronization subsystem sends a request to the initialization subsystem to initialize that particular resource. The Initialization process takes place as previously described; except that the request for initialization comes from the synchronization subsystem instead of the OA&M module.

In Step 12, a check is made to find whether the initialization was successful. If the initialization was successful the program proceeds to Step 14. If not, then it proceeds to Step 13.

In Step 13, the synchronization subsystem adds the current resource to the list of resources whose initialization failed. Then the program loops back to Step 10.

In Step 14, the synchronization subsystem adds the current resource to the list of resources whose initialization succeeded. Then the program loops back to Step 10. In Step 15, the synchronization subsystem sends a report of both the list of resources whose initialization succeeded and the list of resources whose initialization failed to the OA&M module.

By means of synchronization, the proxy database is updated with the changes made to the network element data by systems independent of the EMS. Due to the proxy database being synchronized, there is no need to contact the network elements to obtain such network element data; thus enabling faster response to client queries as described in the previous Client Query section.

Advantages of the Proxy Database

The proxy database system of the present invention provides substantially faster response times for client queries, as was discussed in the section on Client Query.

Since the data in the proxy database is synchronized frequently, it matches the data in the corresponding network elements on a reasonably current basis and eliminates the need to directly access the network elements to retrieve data; thus lessening the burden on the network elements and avoiding the degradation in network performance which would otherwise result.

Since the data in the proxy database is centralized, it is possible to utilize the EMS to do administration of the telephone network itself in addition to administration of individual network elements.

We claim:

1. In a network element management system having means for communicating information from a telephone switching network to a client system, and for communicating configuration commands from the client system to the network, the improvement comprising:

a proxy database for storing subscriber data comprising information as to subscriber requirements and subscriber line characteristics;

bidirectional network interface means for coupling information from, and command signals to at least one element of said network having associated subscriber data storage means;

initialization means for initializing said proxy database at the startup of the element management system, by storing in said proxy database subscriber data received from said associated subscriber data storage means via said network interface means;

database updating means coupled to network interface means for repopulating said proxy database with current subscriber data stored in said associated subscriber data storage means to update the data in said proxy database;

query means responsive to a query signal from said client system for retrieving corresponding subscriber data from said proxy database and communicating the same to said client system;

configuration means responsive to a network element configuration command signal from said client system for altering the configuration of said at least one network element in accordance with said configuration command signal, said configuration means comprising means for translating the configuration command signal into a corresponding network element command signal, means for communicating the network element command signal to said at least one network element via said network interface means, means for receiving at least one response signal comprising a corresponding item of subscriber data from said associated subscriber data storage means via said network interface means, means for storing said corresponding item of subscriber data in said proxy database to update the same, and means for communicating a response message corresponding to said response signal back to the client system; and database synchronization means for synchronizing the subscriber data stored in the proxy database with the corresponding subscriber data stored in said associated subscriber data storage means, said database synchronization means comprising means for downloading log files from said associated subscriber data storage means, means for parsing the log files to detect any changes in said corresponding subscriber data made by network elements other than said element management system, means for transmitting network element commands to said other network elements to retrieve said corresponding subscriber data therefrom, and means for updating said proxy database with said retrieved corresponding subscriber data.

2. The improvement according to claim 1, wherein said response signal indicates whether or not the configuration change requested by said configuration command signal has occurred, and said response message provides verification information respecting said configuration command signal.

3. In a network element management system having means for communicating information from a telephone switching network to a client system, the improvement comprising:

a proxy database for storing subscriber data respecting subscriber requirements and subscriber line information;

network interface means for coupling information from at least one element of said network having associated subscriber data storage means to said proxy database;

initialization means for initializing said proxy database by storing in said proxy database data corresponding to subscriber requirements and subscriber line characteristics received from said associated subscriber data storage means via said network interface means;

database updating means coupled to said network interface means and modifying the data in said proxy database to reflect current subscriber data;

query means responsive to a query signal from said client system for retrieving corresponding data from said proxy database and communicating the same to said client system; and database synchronization means coupled to said network interface means for synchronizing the subscriber data stored in the proxy database with the corresponding subscriber data stored in said associated subscriber data storage means.

4. The improvement according to claim 3, further comprising configuration means responsive to a network element configuration command signal containing configuration data from said client system, said configuration means comprising:

means for translating the configuration command signal into a corresponding network element command signal, means for communicating the network element command signal said at least one network element via said network interface means, means for receiving at least one response signal comprising a corresponding item of configuration data from said at least one network element via said network interface means, means for storing said corresponding item of configuration data in said proxy database to update the same, and means for communicating a response message corresponding to said response signal back to the client system.

5. The improvement according to claim 3 or 4, wherein said database synchronization means comprises:

means for downloading log files from said associated subscriber data storage means, means for parsing the log files to detect any changes in the particular subscriber data respecting said at least one network element made by network elements other than said element management system, means for transmitting network element commands to said other network elements to retrieve said particular subscriber data therefrom, and means for updating said proxy database with said retrieved particular subscriber data.

6. The improvement according to claim 5, wherein said response signal indicates whether or not the configuration change requested by said configuration command signal has occurred, and said response message provides verification information respecting said configuration command signal.

* * * * *